(12) United States Patent
Turtiainen

(10) Patent No.: US 6,430,407 B1
(45) Date of Patent: Aug. 6, 2002

(54) METHOD, APPARATUS, AND ARRANGEMENT FOR AUTHENTICATING A USER TO AN APPLICATION IN A FIRST COMMUNICATIONS NETWORK BY MEANS OF A MOBILE STATION COMMUNICATING WITH THE APPLICATION THROUGH A SECOND COMMUNICATIONS NETWORK

(75) Inventor: Esa Turtiainen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/244,018

(22) Filed: Feb. 4, 1999

(30) Foreign Application Priority Data

Feb. 25, 1998 (FI) ................................................. 980427

(51) Int. Cl.⁷ ............................ H04M 1/66; H04K 1/10
(52) U.S. Cl. ........................... 455/411; 455/456; 380/33
(58) Field of Search ................................. 455/411, 410, 455/414, 432, 456, 407, 406, 408; 380/247, 270, 33, 248, 271

(56) References Cited

U.S. PATENT DOCUMENTS

| | | | |
|---|---|---|---|
| 5,225,713 A | | 7/1993 | Henneberry et al. ....... 307/10.2 |
| 5,537,474 A | * | 7/1996 | Brown et al. ................ 455/411 |
| 5,568,535 A | | 10/1996 | Sheffer et al. ................. 379/39 |
| 5,615,110 A | * | 3/1997 | Wong ......................... 340/7.23 |
| 5,652,564 A | | 7/1997 | Winbush ..................... 340/426 |
| 5,661,806 A | | 8/1997 | Nevoux et al. ............. 380/247 |
| 5,668,875 A | * | 9/1997 | Brown et al. ................ 455/411 |
| 5,668,876 A | | 9/1997 | Falk et al. ................... 380/271 |
| 5,719,918 A | * | 2/1998 | Serbetciouglu et al. ...... 380/271 |
| 5,878,337 A | * | 3/1999 | Joao et al. ................... 455/410 |
| 5,903,830 A | * | 5/1999 | Joao et al. ................... 455/410 |
| 6,038,445 A | * | 3/2000 | Alperovich et al. ......... 455/456 |
| 6,047,270 A | * | 4/2000 | Joao et al. ..................... 705/44 |
| 6,055,638 A | * | 4/2000 | Pascal et al. ................ 380/277 |
| 6,112,078 A | * | 8/2000 | Sormunen et al. .......... 455/411 |
| 6,230,017 B1 | * | 5/2001 | Andersson et al. ......... 455/456 |
| 6,256,503 B1 | * | 7/2001 | Stephens .................... 455/456 |
| 2002/0025797 A1 | * | 2/2002 | Joao et al. ................... 455/406 |

FOREIGN PATENT DOCUMENTS

| | | | | |
|---|---|---|---|---|
| DE | 296 17 734 | | 1/1997 | ............ H04M/1/00 |
| EP | 0 607 767 | | 7/1994 | ............ H04M/1/66 |
| FR | 2 740 291 | | 4/1997 | ............ H04Q/7/32 |
| JP | 07129801 A | | 5/1995 | ............ G07B/15/00 |
| JP | 08249530 | | 9/1996 | ............ G07F/9/00 |
| JP | 09081811 | | 3/1997 | ............ G07B/15/00 |
| NL | 1007409 | | 11/1997 | ............ H04L/9/32 |
| WO | 94/11982 | | 5/1994 | ........ H04M/11/02 |
| WO | 94/30023 | | 12/1994 | ............ H04Q/7/04 |
| WO | 95/19593 | | 7/1995 | ............ G06F/1/00 |
| WO | 95/34998 | | 12/1995 | |
| WO | 96/00485 | * | 1/1996 | ............ H04Q/7/38 |
| WO | 96/11453 | | 4/1996 | ............ G07C/1/30 |
| WO | 96/13814 | | 5/1996 | ............ G06F/17/60 |
| WO | 97/31306 | | 8/1997 | ............ H04Q/7/38 |
| WO | 97/45814 | | 12/1997 | ............ G07F/7/08 |
| WO | 98/06214 | * | 2/1998 | ........ H04M/11/00 |

\* cited by examiner

*Primary Examiner*—William Trost
*Assistant Examiner*—Rafael Perez-Gutierrez
(74) *Attorney, Agent, or Firm*—Nixon & Vanderhye P.C.

(57) ABSTRACT

A method, arrangement, and apparatus for providing an authentication to an application provided through a communications network. A connection is established between the application and a user interface through said communications network so as to enable an access of a user to the application. An authentication is provided to said application by means of a mobile station communicating through a mobile communications network.

20 Claims, 6 Drawing Sheets

METHOD, APPARATUS, AND ARRANGEMENT FOR AUTHENTICATING A USER TO AN APPLICATION IN A FIRST COMMUNICATIONS NETWORK BY MEANS OF A MOBILE STATION COMMUNICATING WITH THE APPLICATION THROUGH A SECOND COMMUNICATIONS NETWORK

FIELD OF THE INVENTION

The present invention relates to a method for providing an authentication to an application. The invention relates further to an arrangement for providing an authentication to an application and further to an apparatus to be used in the authentication.

BACKGROUND OF THE INVENTION

Various electronic applications exist which involve a need for an authentication. Authentication may be required, for example, when a user is accessing a specific application and/or when a user already uses an application and there arises a need to verify the user or to receive such an acknowledgment from the user which allows the application to make some further proceedings.

Examples of applications which might require an authentication include various commercial services obtained through communications networks, such as Internet, Intranet or Local Area Networks (LAN), payments and banking services accessed through communications networks, resource access, remote programming, reprogramming or updating of software etc. Even certain free of charge services obtained through communications networks may require an authentication. The amount of services or applications which require at least some degree of authentication of the user who is trying to access them (or of the user who is already using them but where there is a need to check authorization during the use of the service or a need to acknowledge something during the use) has increased greatly during the past years. The need for the authentication is also expected to increase further in the future.

At present there are already some well known solutions for communication authentication. These normally use various cryptographic techniques between two communicating computer devices. According to a basic scenario for the authentication, a random challenge is given to encryption functions of said two computer devices. Both of these computers have a secret, i.e., an encryption key, which is also given to the encryption function in both of the computers. Thereafter, the results of the calculations of the two encryption functions are compared, and if the result of the comparison is positive, the authentication is considered as being in force. If the comparison gives a negative result, then the authentication test is considered as having failed.

There are also various already existing authentication arrangements. The following examples of the prior art arrangements are given with a brief description of some of the drawbacks thereof:

Passwords. At present, the use of a password or several passwords is the most often used approach for the authentication. The password is given to the remote application through an user interface, e.g., through a computer terminal connected to a communications network. However, this solution does not take the vulnerability of the network into account, since the password is exposed to everyone who has access to the network (and who is skilled enough to read the passwords).

A secret. This may be described as an electronic password or a signature or an encryption key which is stored and used by for example the user interface. Even though the secret is not revealed to the network, it may end up in the "wrong hands" and could be used by some party other than those who are originally intended to be the users of the secret.

Authentication software in the user interface. This is a more sophisticated approach to authentication. The password is given to a program in the user interface, which then automatically authenticates cryptographically access to the requested application. Even though this provides a more secure arrangement than the above solution, it still leaves a possibility for catching the passwords from the user interface. It is also possible to modify the software without notice to the actual user.

Smart cards with associated readers. A smart card is capable of communicating encrypted challenge-response messages, but it does not contain a user interface for receiving an authorization from the user itself. Such an interface may exist in the smart card readers, but such readers must be well protected against any possibilities for misuse, and thus the ordinary users (i.e., the large majority of users, i.e., the public) cannot usually have physical access to these reader interfaces, but they have to trust to the organization providing the smart cards. In addition, the smart card readers cannot be shared between organizations which do not have trust to each others.

Smart cards with a user interface. These do already exist, but they are expensive since each security processor must have a secure user interface of it's own. These are rare and the input/output capability thereof is still extremely limited, and thus they are not held to be an economically suitable solution for the authentication problem.

A separate personal authentication device. In this approach the user is used as "a communication means" between the user interface and a separate authentication device. The user interface gives a challenge which the user then types in to a hand held authentication device (pocket-calculator like device). The authentication device may, e.g., give a number as a response, and the user then types this number in to the user interface. In this the problems relate to the need of purchasing, using and carrying a separate device. In some instances there is also a possibility of incorrect typing of the usually long and complex character strings.

The above already mentions some parties which may be involved when implementing the present authentication systems. They are briefly explained in more detail in the following:

The user is usually a human being who uses various applications or services. The user can be identified by means of a password (or secret) which is only known by him/her (a public key method), or by means of a secret which is shared between the user and the application (a secret key method).

The application is the party that wants to ensure the authenticity of the user. The application can also in some occasions be called as a service. From the application's point of view the authenticity question can be divided in four different categories (questions): 1) is the user at the moment in the other end? (so called peer-entity-authentication), 2) are the further messages received from the same user? (integrity of the message stream), 3) does a specific message originate from a certain user? (data origin authentication), and 4) is the message such that even a third party may believe it to originate from a certain user? (non-repudiation).

The user interface is the device or arrangement which enables the user to access the application or service. In most instances it can also be referred to as a terminal, and may consist of devices such as computers (e.g., Personal Computer, PC), workstations, telephone terminals, mobile stations such as mobile telephones or radios or pagers, automatic money teller and/or banking machines, etc. The user interface provides input/output facilities and it may possibly even provide a part of the application.

The Personal Authentication Device (PAD) is a piece of hardware that the user carries with him. The PAD may have some basic input/output functionality and even some processing facilities. The above referred smart cards and separate authentication devices may also be considered as PADs. In most cases the user can rely on his PAD, since the user has it (almost) always with him and thus under continuous control. All the possible passwords or secrets are hidden in the hardware thereof such that there is no easy manner to reveal them. The device itself is not easy to modify such that the communication path between the user and the security processor could be endangered. In addition, the PADs usually have a minimum amount of stored state and the programs thereof are not easily modifiable.

SUMMARY OF THE INVENTION

Even though the above described prior art solutions for authentication already exist, there are still some shortages, in addition to those already referred to above, in the area of authentication.

In case the access to the application is made absolutely secure, or as secure as possible, the application easily becomes extremely complex from the architecture thereof, and becomes also complicated and more time consuming to access and use. The increased security level increases the amount of the required hardware and software, which leads to an increased need for maintenance and updating thereof, and thus the total costs of the authentication may become high. The complexity and costs could be decreased by lowering the level of security, but this is expected to lead to an insufficient security level in the communications. In addition, it is believed that an "absolutely secure" condition does not even exist in the communications networks, as the technical development makes it possible for hackers to solve even the most complicated security arrangements.

A human problem lies on the fact that the passwords or secrets may become quite complicated and/or too long, or that there may be too many of them. Thus the users may find it hard to remember them. Typically a secret which is considered as secure in the secret key method is 128 bits and in the public key method it is 1024 bits. For most people it is impossible to remember this kind of key.

In addition, users are not able to perform the calculations required in the authentication without external devices. As was explained above, the basic authentication is often made by challenge and response method. This would require the user (i.e., a human) to encrypt something with his secret. This is not held to be possible in practice.

In addition to the possibility of catching the password or secret during it's transmission over an open communications network as was discussed above, today's solutions do not pay sufficient attention to the vulnerability of the user interfaces either. The terminal devices have developed to be full of complex technology and software such that most of the users are no longer capable of fully controlling the terminals, or understanding the operation thereof. In addition, it often occurs that many users share the same terminal device (e.g., is a commonly used PC) and/or that external maintenance personnel has access to the computers of a per se closed organization.

The computer terminals contain stored state and programs in the memory means thereof, which can be modified. In modern computers it is possible to modify the software thereof even such that the user does not notice this, and even through the communication paths without any physical access to the device itself. To give an example of the risks, it is possible to modify a program in a computer terminal such that it modifies the data the user sends for example to a bank such that the computer modifies all bank transfers on a certain day to another account than what was designated by the user. This modifying or reprogramming without notice may cause serious and huge damages when used against ordinary individual users, and especially when used against organizations such as companies or public administration. This all means that the ordinary terminal devices and communication paths cannot be trusted.

Therefore it is an object of the present invention to overcome the disadvantages of the prior art solutions and to provide a new type of solution for authentication.

An object is also to provide a method and an arrangement by means of which a user who wishes to access an application can be authenticated in a more secure manner than has been possible in the prior art. An object is also to provide an authentication when a need for the authentication arises during the use of an already accessed application.

An object of the present invention is also to provide a method and arrangement by means of which a mobile station can be utilized in the authentication.

An additional object of the present invention is to provide a solution in which an identification module of a mobile station can be utilized in the authentication.

Other objects and advantages of the present invention will be brought out in the following part of the specification taken in conjunction with the accompanying drawings.

The objects are obtained by a new method for providing an authentication to an application provided through a communications network. According to the present invention a connection between the application and a user interface through said communications network is established so as to enable an access of a user to the application provided through the communications network, while an authentication to said application is provided by means of a mobile station communicating through a mobile communications network.

According to one further embodiment the authentication method comprises a step of establishing a connection between an application and a user interface through a communications network so as to enable an access of a user to the application provided through the communications network. The authentication to said application is provided by means of a mobile station such that a secret of a Subscription Identification Module (SIM) of the mobile station is utilized in encryption operations of the authentication.

The invention provides further an arrangement for providing an authentication to an application provided by an application provider through a communications network. The arrangement comprises a user interface and a connection between the application and the user interface through said communications network so as to enable use of the application. The arrangement further comprises means for authenticating the use of the application, wherein said means for authenticating comprise a mobile station communicating through a mobile communications network and a link between the application implemented by the communications network and the mobile communications network.

According to an alternative embodiment the invention provides a mobile station for providing an authentication to an application provided through a communications network. In this embodiment the application is accessed by means of a user interface connected to the communications network, while said mobile station is using a different communications network for the communications than the user interface. Said mobile station is used for authenticating the use of said application accessed by the user interface.

Several advantages are obtained by means of the present invention, since the solution introduces a new reliable manner for authentication. The inventive authentication method and arrangement is easy to implement in already existing communications networks without any excessive alternations or additional devices. The arrangement can be used in connection with various different applications, in practice in connection with any such application provided through a communications system which needs some kind of authentication.

The user is freed from carrying a separate authentication device (PAD) or many different authentication devices. The user can also trust to the personal authentication device (PAD) according to the present invention, as the mobile station is usually always with him, and the users tend to take good care of their mobile stations. In addition, for instance in case of theft of a mobile station, the mobile subscription and/or the SIM thereof can be easily canceled by the operator. All secrets of a mobile station are well hidden in the hardware thereof such that it is not easy to reveal them. In addition, the mobile station device itself is not easily modifiable in such a way that the communication path between the user and the security processors could be endangered.

The system includes a minimum amount of stored state and the programs are not easily modifiable. The existing SIM of a mobile station, and more precisely the secret thereof, can be utilized for the required encryption procedures. Thus the SIM can be utilized as a security card for new purposes, and there is already an existing party who will control the use of the SIM, i.e., the mobile network operator who can immediately cancel a SIM if fraud is suspected.

In the following the present invention and the other objects and advantages thereof will be described by examples with reference to the annexed drawings, in which similar reference numerals throughout the various Figures refer to similar features. It should be understood that the following description of the invention is not meant to restrict the invention to the specific forms presented in this connection but rather the present invention is meant to cover all modifications, similarities and alternatives which are included in the spirit and scope of the appended claims.

DETAILED DESCRIPTION OF THE DRAWINGS

Figure 1:
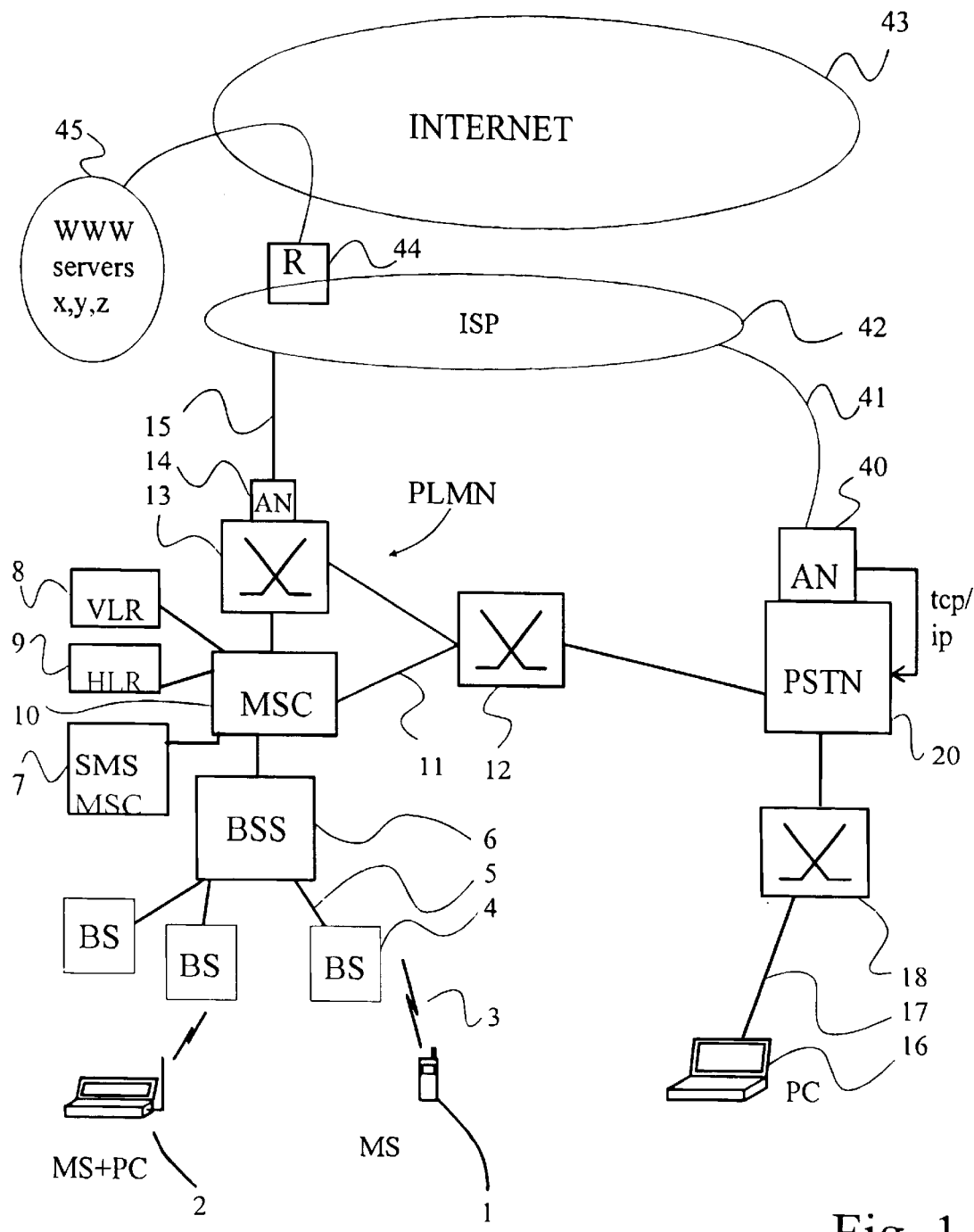
FIG. 1 shows a general view of one possible arrangement of communications networks in which it is possible to implement the present invention.

FIG. 1 is a schematic representation of one network arrangement which can be used when implementing the present invention. The arrangement of FIG. 1 comprises a Public Switched Telephone Network (PSTN) which is schematically shown as a box designated by 20. The exemplifying PSTN is a fixed line telephone network (or Plain Old Telephone Service, POTS), which forms a communications network through which a user interface 16 is enabled to access an application. According to this embodiment a user (not shown) may use the user terminal 16 connected to the PSTN as a user interface to access the desired service in one of the WWW servers 45 obtainable through an Internet connection. The disclosed terminal 16 is a personal computer (PC), but other types of user interfaces, such as workstations, automatic public teller machines etc. may also be used.

A Public Land Mobile Network (PLMN) is also disclosed. This may be, for example, a cellular telephone network or similar mobile communications system. Two mobile stations MS 1 and MS+PC 2 are also disclosed. The MS+PC 2 may be defined as an integrated mobile phone and a portable computer. Both of these are capable of communicating through an air interface 3 with the PLMN through one of several base stations (BS) 4 of the PLMN.

One type of PLMN is a digital GSM network (GSM; Global System for Mobile Communications), which is well specified in the GSM recommendations by ETSI (European Telecommunications Standard Institute), the network architecture thereof being described in detail in recommendations GSM 01.02 or GSM 03.02 or the revised versions thereof. It is to be noted that while the invention is mainly described in the context of an exemplifying cellular telephone network using GSM terminology, those skilled in the art will appreciate that the present invention can be implemented in any mobile system. Furthermore, it is to be noted that for clarity reasons only those parts of a mobile network structure are shown which are considered as necessary for the purposes of illustrating the operation of the exemplifying system. The skilled person is well aware of the fact that the telephone networks may normally comprise also other necessary apparatus than those illustrated, that some of the disclosed elements of the PLMN or PSTN may be omitted or replaced by some other type of elements, and that a great number of mobile networks and ordinary fixed land line networks may cooperate and interchange with each other. The skilled man understands also that the connection to the Internet may also be a direct connection without any PSTN or similar network arrangement between the user terminal 16 and the Internet 43. These alternatives are, however, not shown and explained in more detail as they are known to skilled man in the art.

The GSM based public land mobile network (PLMN) usually includes several PY mobile service switching centers (MSC) 10. Each of these is, in turn, connected to a plurality of base station subsystems (BSS) 6 (only one MSC and BSS is shown for clarity). The base station subsystem 6 usually comprises a base station controller BSC and necessary interface apparatus, and is connected to a plurality of base stations (BS)4, each of which supervises a certain geographical area, referred to as a cell (for the cells, see FIG. 7).

The mobile services switching center 10 of FIG. 1 is further connected or linked to the public switched telephone network (PSTN) 20 through an exchange 12 and lines 11. The MSC 10 is also connected to a global communications network, which in the example is the Internet (designated by numeral 43). The MSC may be connected to an integrated services digital network (ISDN) or any other type of appropriate communications network. The necessary links between different components of different telecommunication network systems are per se well known in the art.

The PLMN network further includes a database, the so called home location register (HLR) 9, which is connected to the MSC. Those mobile terminals 1 and 2 which are subscribers of the mobile telecommunications network are registered in the HLR 9. Each local mobile telephone switching center 10 further includes a local database called a visitor location register (VLR) 8, into which is registered all such mobile stations 1 and 2 which are located within the area of one of the cells handled by that local mobile telephone services switching center MSC at any given moment.

The mobile stations are identified by a SIM (Subscriber Identification Module) which is usually mounted within each of the mobile stations, or otherwise physically connected thereto. A SIM is a module which includes various user (subscription) related information and secrets. It may also include further information which relates to the encryption of the radio communications. The SIM may be assembled fixedly or removably to the mobile station. The utilization of the SIM as well as the HLR and/or VLR registers in this invention will be discussed in more detail later in this specification.

As discussed, the user may be connected to the Internet 43 via a fixed or a mobile network or via a direct connection. However, there may be some differences between the connections when for example GPRS (General Packet Radio System) is concerned, but the service from the Internet network is available for the users of both PSTN and PLMN systems. In the example, the Mobile Switching Center (MSC) 10 as well as the PSTN 20 are provided with an access to the multiprotocol Internet 43 by access nodes (AN) 14 and 40. Even though only one AN per communications network is disclosed, it is to be understood that in practice the number of ANs may be essentially greater, and that the number of ANs is also increasing continuously. According to one solution a special Internet Access Server IAS capable of converting the signal into data packets is used as an AN towards the Internet.

The users of the Internet 43 have made a contract with a Internet Service Provider (ISP) 42, who provides the communications connection to the Internet from the user terminals 1, 2, or 16. When the user desires to have an Internet connection, he calls to the Internet Service Provider (ISP) 42 so as to connect his terminal 16 to the desired address (so called Internet Protocol address). The call connection is established by the PSTN 20 and passes through at least the local exchanges 18, and perhaps one or several transit exchanges which are connected or interconnected through trunk lines (not shown). It is to be understood that even though FIG. 1 discloses only one ISP through which both networks communicate towards the Internet, communication could be arranged through different ISPs.

FIG. 1 discloses further a WWW server 45 (World Wide Web server) which includes server databases x, y and z providing different services. It discloses also a connection from the ISP through the router 44 to said server 45 via the Internet 43. It is to be understood that the service can be any service obtainable through any communications network, such as a banking service, an electronic shopping service etc., in which authentication is required.

The mobile station 1 (or 2) is used as a personal authentication device (PAD) when the user accesses, or has already accessed, via the user interface 16 through the PSTN 20, a service x provided by the WWW server 45. The mobile station 1 communicates with the service x through a separate communications path or channel than is used by the actual user interface 16. The mobile station can be trusted because the user usually keeps it always with him. The ergonomic and functional requirements for the mobile stations and for the conventional PADs are essentially the same, and the MS has a user interface that is suitable for the PAD. A modern MS has even a security processor interface that is suitable for authentication purposes.

There are several alternatives to accomplish the authentication by means of the mobile station, and the examples thereof will be now discussed in the following in more detail.

Figure 2:
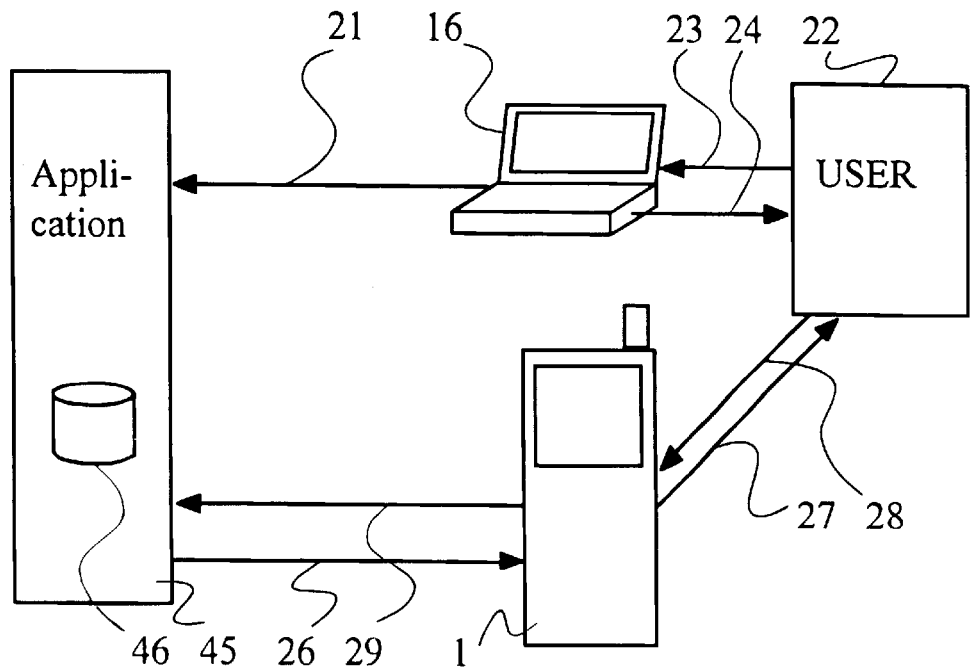
FIG. 2 is a schematic presentation of an embodiment for authenticating a user according to the present invention.
Figure 4:
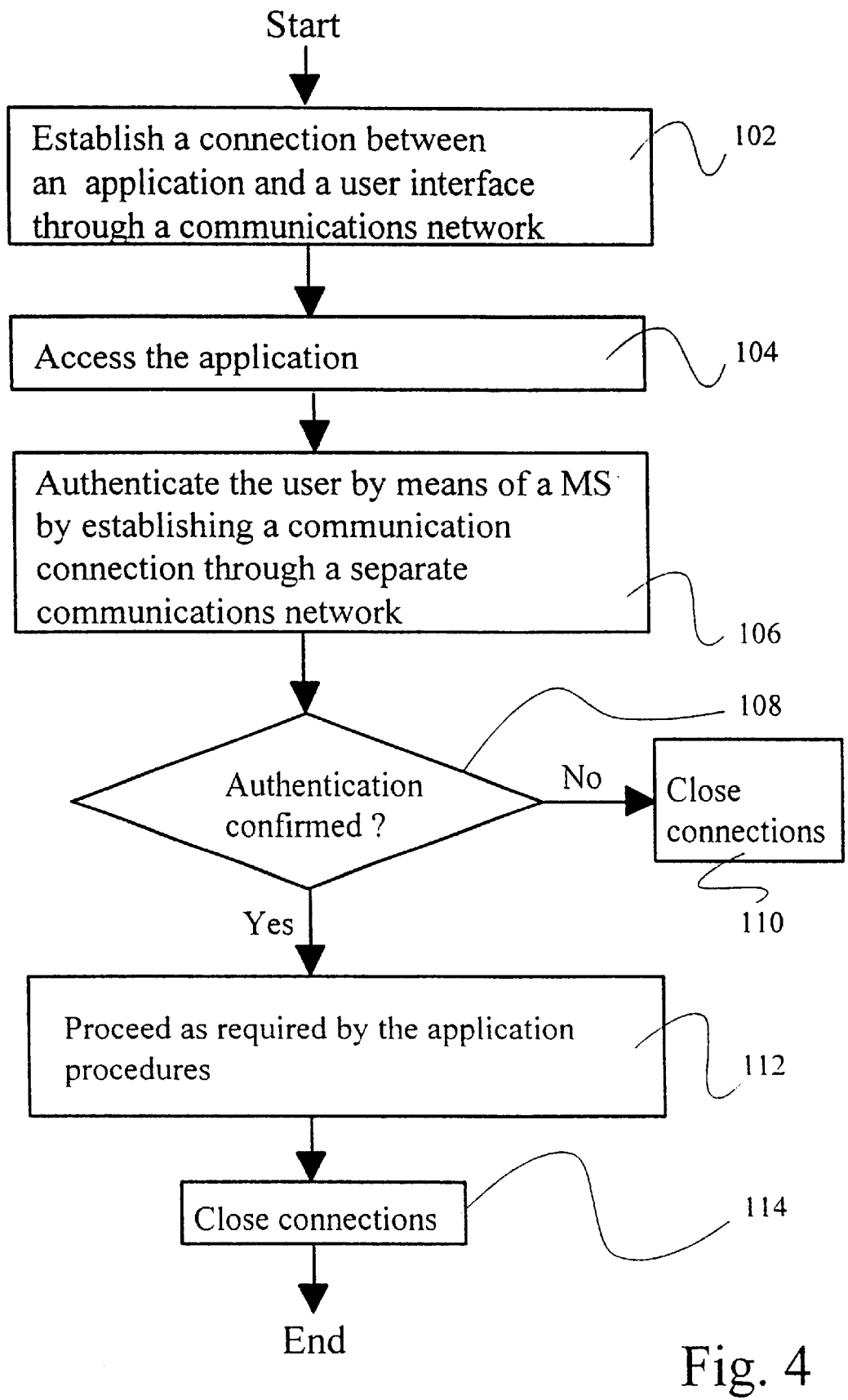
FIGS. 4 and 5 disclose flow charts according to two embodiments of the present invention.

Reference is now made to FIGS. 2 and 4, of which FIG. 2 discloses schematically one arrangement for the authentication and FIG. 4 a flow chart for the operation in accordance with one basic embodiment. The user 22 sends a request by means of the user terminal 16 to access a desired application 45, such as a banking service, through a connection established by means of a communications network (arrow 21 in FIG. 2; steps 102 and 104 in FIG. 4). The application 45 may comprise a database 46, or is connected to a separate database, such as the HLR 9 of the MSC 10 of FIG. 1, from which the application is enabled to retrieve the necessary user information. On the basis of this information the application establishes a connection to the mobile station 1 of the user 22 (arrow 26; step 106) for authentication purposes. At this stage the user may accept the connection 21 made by the user interface 16 by sending back a confirmation signal 29 (i.e., an acknowledgment) using the mobile station 1 indicating that access is allowed and that the actual use of the service may begin (steps 108 and 112). In case the authentication fails, e.g., on the basis that the application cannot reach the MS 1, all connections are closed (step 110). Alternatively the user may be allowed to retry the access, either immediately or after a certain time period, or the user may be instructed by the user interface 16 to take some additional measures due to the failed authentication.

One way to implement the authentication, or the acknowledgment feature, is to use short messages of a short message system (SMS) of the PLMN. In the GSM system, a SMS MSC (SMS Message Service Center) designated by 7 in FIG. 1 is provided for the delivery of short messages to and from the mobile stations. The service center 7 sends the messages to the mobile subscribers using the same network elements as were discussed above and defined by the referred specifications. The SMS message signaling usually contains, e.g., the receiver identification, sender information, time stamp etc.

Figure 3:
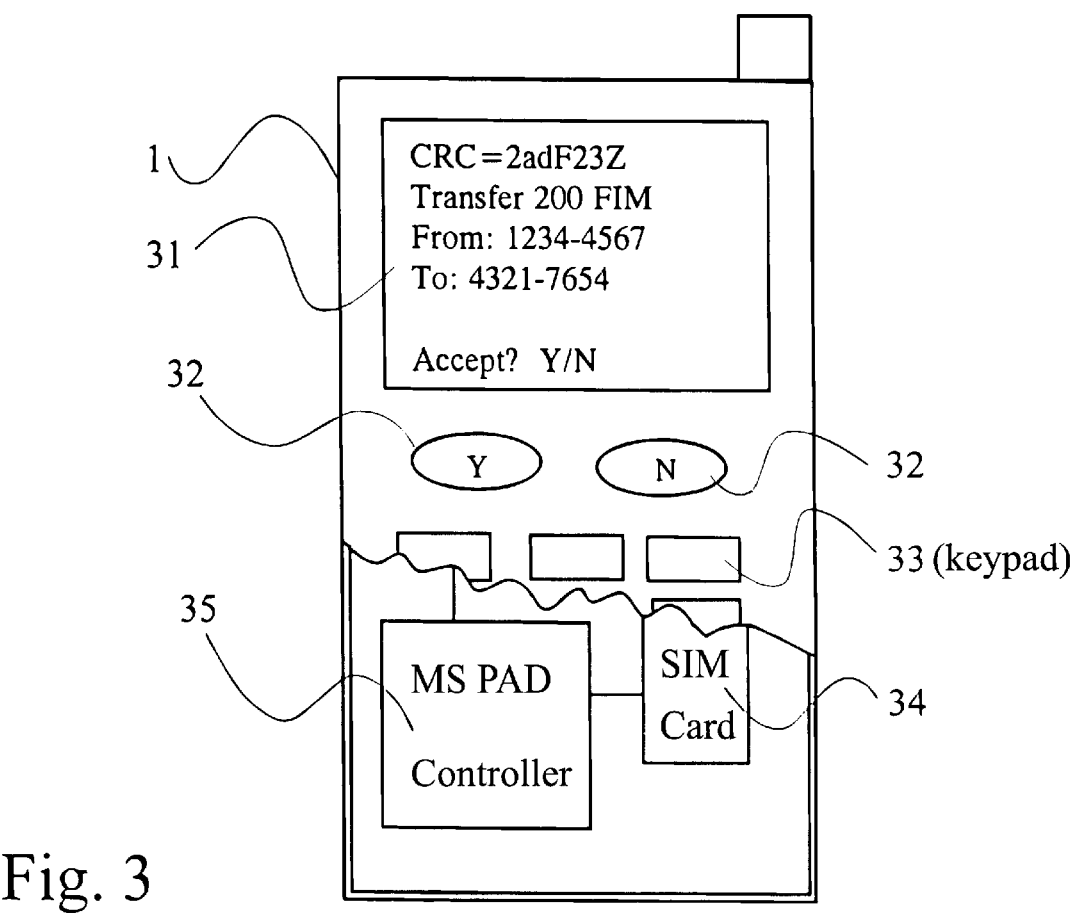
FIG. 3 discloses schematically one possible mobile station and an embodiment of the present invention.
Figure 5:
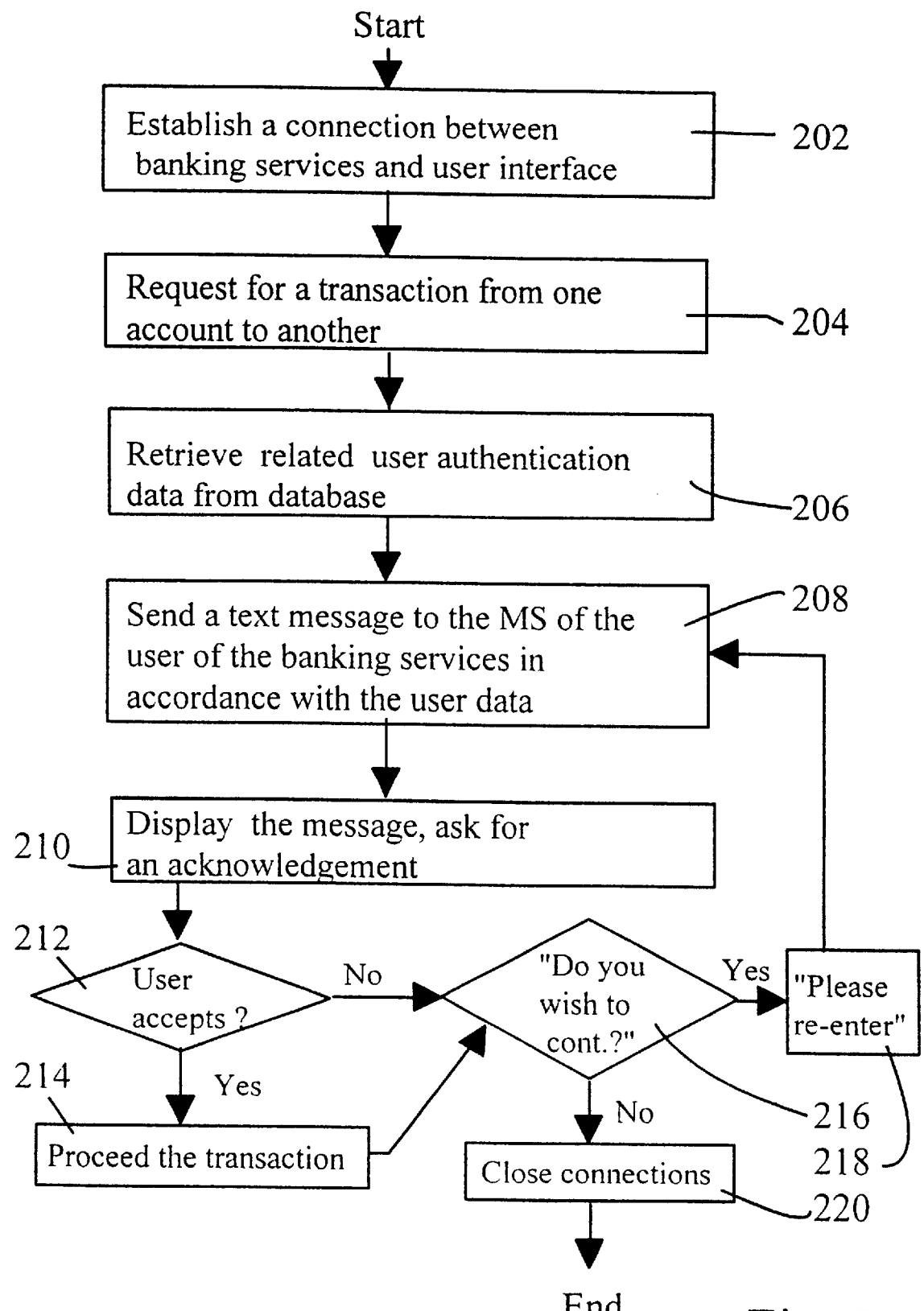

FIG. 3 discloses a solution in which the mobile station MS 1 has received a SMS message. The method steps for this are shown by the flow chart of FIG. 5. According to this embodiment the user has requested, after having accessed the banking service through the user interface 16, that a sum of 200 FIM should be transferred from account No. 1234-4567 to an account No. 4321-7654 (step 204). The application retrieves the user related authentication data from an appropriate database (step 206), and sends accordingly a text message to the mobile station 1 (step 208). The MS 1 displays the text as shown, and asks the user to confirm or to deny the transaction by pressing "Yes" or "No" keys, respectively (step 210). The response is then transmitted back to the application, and in case of "Yes" the transaction proceeds (step 214) and in case of "No" some other measures are taken.

The arrows 27 and 28 of FIG. 2 can also be seen as illustrating the stage in which the MS 1 and the user 2 communicate: information received by looking at the display 31 of the MS 1 is indicated by arrow 27, and the response given by the user to the MS 1 is indicated by arrow 28. As explained, the user may choose a proper selection by pressing either Y or N key 32 of the MS. In case the user accepts, i.e., "signs" the transaction, the banking service will then proceed accordingly. In case the user will not confirm the transaction, i.e., presses the "No" key, the application may send a request to the user interface to feed in a correction, a cancellation, a new destination account, etc. (steps 216, 218).

In case the application does not receive any response within a certain time period, or the response is somehow incorrect, the application may either send a second request for the confirmation, or close down all the connections.

The user may process several subsequent transactions and even some other banking services after having once accessed the application. When the user finally replies at step 216 to the user interface 16 that he does not want to continue, the connections are closed (step 220).

According to one embodiment of the present invention the information contained in the HLR and even in the VLR of the PLMN of FIG. 1 can be utilized when implementing the inventive authentication arrangement. This is enabled by the fact that each of the mobile subscriptions includes, in the HLR 9 of FIG. 1, information relating to the SIM (Subscriber Identification Module) already referred to, an IMSI (International Mobile Subscriber Identity) and MSISDN (Mobile Subscriber ISDN number) as well as to the location information (VLR number), basic telecommunications services subscriber information, service restrictions, and supplementary services, etc.

Therefore FIG. 3 can be seen to disclose also a SIM (Subscriber Identification Module) card 34 inserted within the MS 1. The telephone company usually uses the SIM for controlling payments and location of the user. Thus the SIM card 34 has to be connected to the MS 1 before taking it into use, and making telephone calls. The MS 1 of FIG. 3 includes further a MS PAD controller 35 (Mobile Station Personal Authentication Device controller). From these the SIM 34 may be used in the invention as the means for identifying the user and/or including a secret or several secrets, and the MS PAD controller 35 is used for controlling the authentication operations. In addition to the general control of the authentication procedure, the controller 35 may, e.g., be arranged to make all the calculations relating the various encryption operations. The arrangement in which the SIM 34, which is controlled by the MS PAD controller 35, can be utilized in the authentication procedure varies. Examples thereof are shortly explained in the following.

Instead of the above referred arrangement utilizing SMS services, the transactions can also be acknowledged such that the application, such as the banking service or another commercial service paid by an electronic transaction, sends the details of the transaction to the MS PAD 35 as a data signal through the mobile network. The correctness of the signal can be ensured by means of a checksum calculated by the MS PAD 35 in accordance with a predefined algorithm and utilizing the secret of the SIM 34: the checksum has to match with the sum displayed by the user terminal 16. If the user accepts the transaction, he acknowledges it and gives a permission for the MS PAD 35 to "sign" the message signal 26 from the application by using user's secret (e.g., when using public key encryption and a non-repudiation is required) or using a secret shared with the application. Thereafter the application will proceed as requested by means of the user interface. According to one embodiment, the secret or secrets of the SIM 34 can also be used for the encryption of the messages and/or signaling between the application and the MS.

Figure 6:
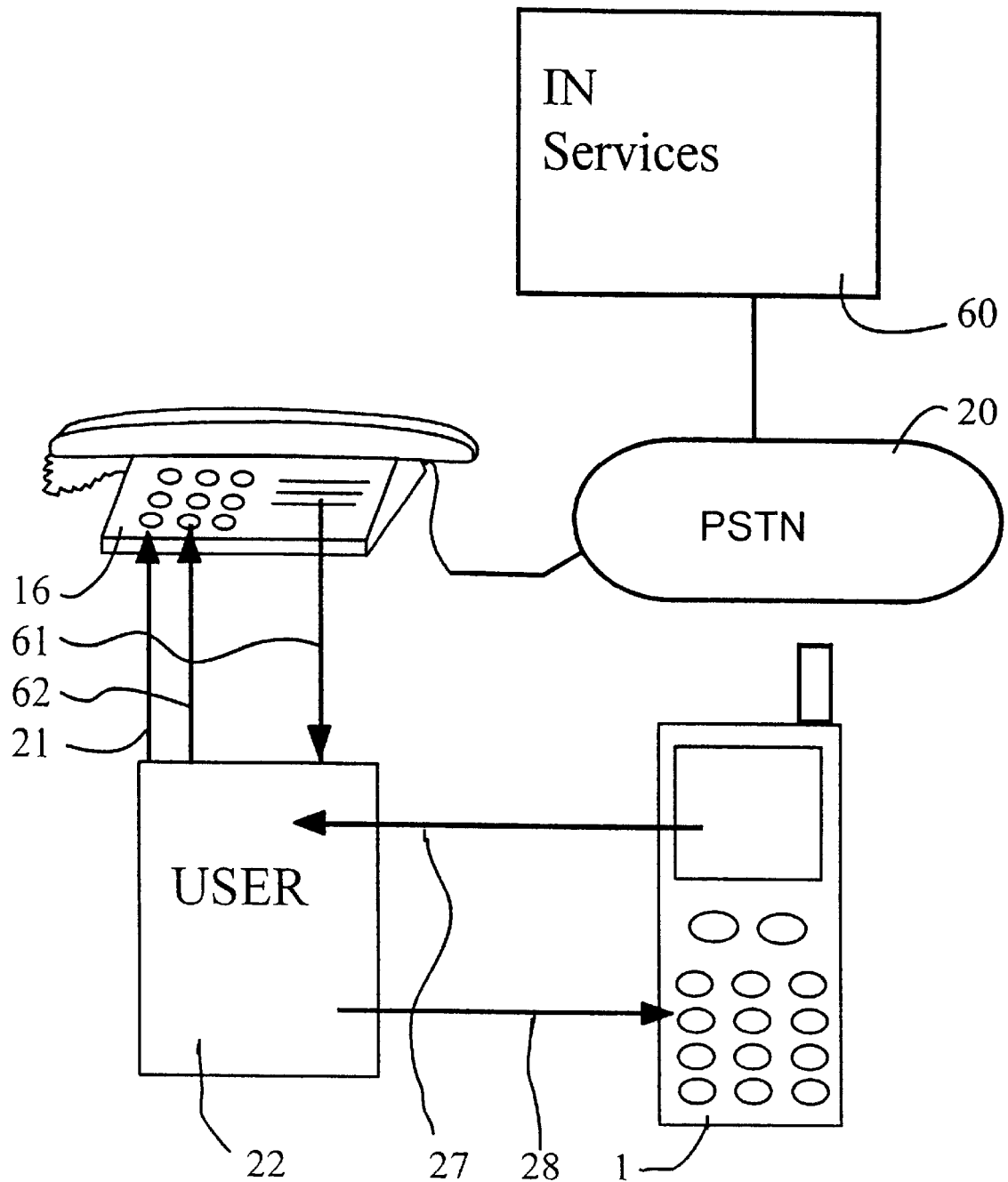
FIG. 6 discloses an alternative embodiment for the authentication in accordance with the present invention.

FIG. 6 discloses an alternative embodiment for FIG. 2. In this embodiment the user interface 16 is in a form of an ordinary telephone terminal connected to the PSTN 20 in a per se known manner. The PSTN is further connected to intelligent network services (IN) 60 which forms the application in this embodiment. The mobile station 1 includes a PAD controller 35 and a SIM 34 as described above in connection with FIG. 3. According to one embodiment MS PAD pairs, which contain a predefined pair of a service identifier for the given service and a personal secret, are stored within the PAD controller. These pairs may be used, e.g., in the following manner.

The user accesses a service in said IN by establishing a telephone call to the service (arrow 21). The application challenges the user with a number given as a voice message, or by means of a possible display on said telephone terminal (arrow 61). The user keys in this challenge together with a specific number for the service to the MS by the keypad 33 (arrow 28), whereafter the PAD controller accomplishes the necessary calculations according to predefined algorithm to receive a further number strings. In this calculation the secret stored to the SIM for that particular user may form a part of the algorithm. This secret may be either an application specific secret or a secret of the PLMN. The result of the calculation is then fed in to the user interface 16 (arrow 62), and transmitted to the IN service in question through the PSTN 20. In case this matches to the expected value, the IN service 60 allows the user to initiate the use thereof by the fixed line terminal 16.

The above mentioned embodiment can be used, e.g., when paying telephone calls or services obtained through any ordinary POTS line telephone. For instance, this enables an arrangement in which calls by any telephone terminal are charged from the mobile telephone subscription (i.e., from the holder of a particular SIM card). The mobile subscribers may find this service useful, e.g., in instances where the calls made by the mobile telephone are more expensive than calls by an ordinary POTS telephone, or when the MS 1 is not within an area of any such mobile network into which the user could have a proper radio connection.

According to one additional embodiment (not shown) the mobile station 1 and the user interface 16 are capable of directly communicating with each other through suitable operational connection, such as a radio connection, an infrared connection or a fixed conduit connection with necessary couplings. This reduces the risk for mistyping errors which the user might do when acting as a "link" between the MS 1 and the user interface 16.

According to one alternative a mobile station is arranged to receive more than one SIM card 34. By means of this, one single mobile station could be used for different authentication purposes. For example, a user could have three different SIMs: one for the authentications required by his work, one for the personal needs, and one for a still further need, e.g., for a "chairman of an association". Each of the SIMs may have a telephone number, alarm tone etc. of their own.

According to a further alternative the MS 1 communicates through a PLMN with the application, and the messages and/or signaling required in this communication is encrypted using the secret or secrets of the SIM. This enables a secure communications using only one communications network, i.e. the PLMN, as the secret of the SIM is unique, and it is not possible for third parties to obtain information contained in the signaling or to break into the signaling.

Figure 7:
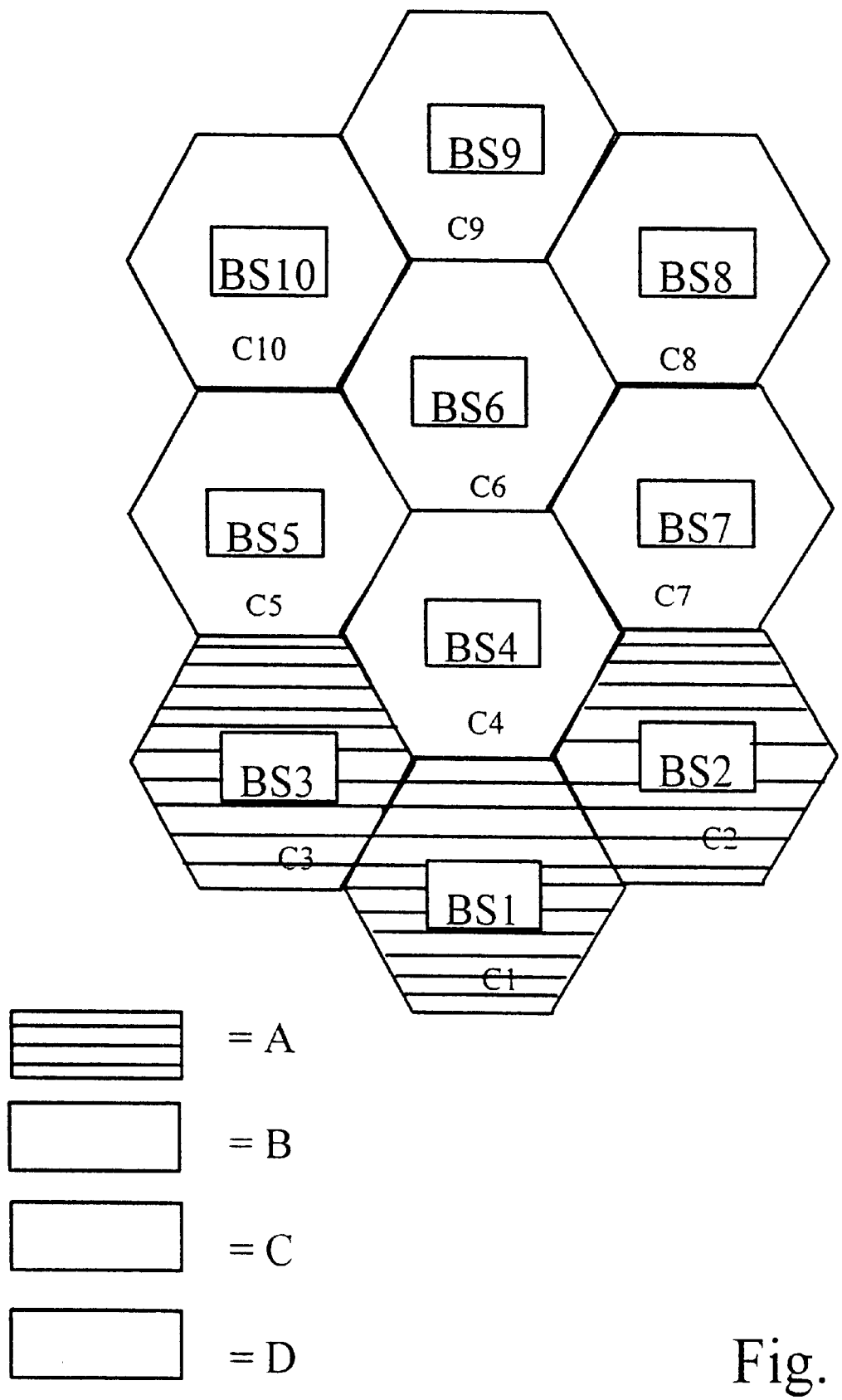
FIG. 7 is a schematic presentation which relates to a further embodiment of the present invention.

A further embodiment of the present invention is now explained with reference to FIGS. 1 and 7. FIG. 7 discloses a schematic cell map of an arbitrary geographic area, which is divided into a plurality of contiguous radio coverage areas or cells. While the system of FIG. 7 is illustrated so as to include only ten cells (C1 to C10), the number of cells may in practice be larger. A base station is associated with and located within each of the cells, these base stations being designated as BS1 to BS10, respectively. The base stations are connected to the base station subsystems (BSS 6 of FIG. 1). A cell may also cover one or several base stations. The cells are grouped into four groups A to D, wherein each group may include one or more cells, as is marked by corresponding markings.

Each group is seen by the system as one unit, i.e., one area, such that four different cell categories A to D are provided. The purpose of this is to illustrate that the cells may be divided into different authentication categories, or classes. The idea behind this is that the authentication data within the authentication database may include restrictions which do not allow the user to access the application in case he is not situated within a certain predefined cell area. For example, if a company uses a MS of an employee for authentication, it is possible to limit the area such that the authentication possibility can be restricted to be allowed only in those cells (e.g., within the area A) which are near to the office of the company.

The above can be easily implemented by means of the visitor location register VLR, designated by 8 in FIG. 1. The mobile station (MS) 1 or 2 roaming in the area of the MSC is controlled by the VLR 8 which is responsible for this area. When the MS 1 or 2 appears in the location area, the VLR initiates an updating procedure. The VLR 8 has also a database which includes, e.g., the IMSI, MSISDN, and location area in which the MS is registered according to, e.g., GSM 09.02 specification. So-called cell global identification includes further a cell identity, and is included in the messages between the MS 1 and the MSC 10. This information may be used as an identification indicator to find the mobile station MS 1 location, which is then utilized in this embodiment.

It is noted herein that the mobile station can be any kind of apparatus providing a possibility for mobile communications for a user other than the mobile telephone 1 or the integrated unit of mobile telephone and a computer 2. The latter arrangement is sometimes also referred to as a "communicator". One example of other suitable mobile station is a pager, i.e., the "beeper" capable of displaying a character string. What is important is that the mobile station is capable of receiving and/or transmitting desired information, which in some instances may even be in the form of text or voice messages only instead of a specific authentication signal or code.

In addition, in the above examples the application 45 is arranged to provide linking between the two communications networks such that they both can be used for the connection of the user to the application. However, this may well be accomplished by some other party. For instance, the ISP or similar service provider or the telecommunications network operator may operate as an authenticating organization and/or provide the linking between the two communications networks, and provide a secure connection to the actual application.

Thus, the invention provides an apparatus and a method by which a significant improvement can be achieved in the area of authentication. The arrangement according to the present invention is easy and economical to realize by per se known components and is reliable in use. It should be noted that the foregoing examples of the embodiments of the invention are not intended to restrict the scope of the invention defined in the appended claims. All additional embodiments, modifications and applications obvious to those skilled in the art are thus included within the spirit and scope of the invention as set forth by the claims appended hereto.

What is claimed is:

1. An arrangement for authenticating an application provided by an application provider through a communications network, comprising:

a user interface;

a first connection between the application and the user interface through the communications network so as to enable use of the application;

a database, accessible by the application, for storing user authentication information including information indicating one or more geographical cells associated with a cellular radio communications system from which the user may access the application;

a mobile station; and an authentication controller for enabling an authentication procedure if the mobile station is situated in the one or more geographical cells associated with the cellular radio communications system, and if so, communicating over a second connection established between the application and the mobile station corresponding to a cellular radio communications channel associated with one of the geographical cells at least some of the user authentication information to the mobile station.

2. An arrangement according to claim 1, wherein the mobile station comprises a mobile station personal authentication device (MS PAD) arranged to control the authentication procedure, and a subscription identification module (SIM including a secret and being operationally connected to the MS PAD, wherein the secret of the SIM is arranged to be utilized in the authentication procedure.

3. An arrangement according to claim 1, wherein authentication signaling to and from the mobile station is in the form of text messages provided by a short message system (SMS) of the cellular radio communications system.

4. An arrangement according to claim 1, wherein the application is a banking service, an electronic shopping service, or some other commercial service requiring an acknowledgment for an electronic transaction.

5. An arrangement according to claim 1, wherein the mobile station comprises an infrared or radio transceiver capable of directly communicating with the user interface.

6. An arrangement according to claim 1, wherein mobile station is a cellular telephone communicating over a digital cellular radio communications system.

7. A method for authenticating a user to an application, the method comprising:

establishing a first communications channel between the application and a user interface through a communications network so as to enable a user to access the application;

retrieving user authentication information from a database including information indicating one or more geographical cells associated with a cellular radio communications system from which the user may access the application;

establishing a second connection between the application and a mobile station through a separate, cellular radio communications channel associated with one of the geographical cells;

authenticating the user to the application by confirming that the mobile station is currently situated within one of the geographical cells associated with the cellular radio communications system included in the user authentication information; and communicating at least some of the user authentication information with the mobile station through the separate, cellular radio communications channel associated with the cellular radio communications system.

8. A method according to claim 7, wherein the step of authenticating comprises using the mobile station such that a secret of a Subscription Identification Module (SIM) of the mobile station is utilized in encryption operations of the authentication.

9. A method according to claim 7, wherein the step of authenticating comprises using the mobile station for acknowledging a transaction or proceeding which the user has previously requested from the application through the user interface.

10. A method according to claim 7, further comprising utilizing a secret of a Subscription Identification Module (SIM) of the mobile station for encryption of signaling associated with the authenticating step.

11. A method according to claim 7, wherein the step of authenticating comprises using the mobile station to verify the identity of the user as the user accesses the application by the user interface.

12. A method according to claim 7, wherein at least part of the signaling between the application and the mobile station is in the form of short message system text messages.

13. A method according to claim 7, wherein a Subscription Identification Module (SIM) of the mobile station is used for providing the identity of the user.

14. A method according to claim 13, further comprising:

charging costs of the connection from the user interface to the application to a holder of the subscription identified by the SIM.

15. A method according to claim 7, wherein the mobile station is a cellular telephone communicating with a digital cellular communications system.

16. A mobile station comprising:

means for establishing a first communication path between a user interface and an application to access a service provided by the application;

means for providing the mobile station s current cell location with a cellular grid associated with a cellular radio communications system;

means for establishing a separate, second communication path for authenticating use of the application over a cellular radio channel associated with the mobile station's current cell location; and means for authenticating the use of the application if the current cell location of the mobile station is in an authorized cell location with the cellular grid.

17. A mobile station according to claim 16, further comprising means for providing the mobile station's current cell location, wherein the means for authenticating is arranged to determine whether the current cell location of the mobile station is consistent with an authorized cell location from which to access and use the application.

18. A mobile station according to claim 16, wherein the mobile station is a digital mobile telephone and comprises a subscription identification module (SIM) including a secret, wherein the secret of the SIM is arranged to be utilized by the means for authenticating.

19. A mobile station according to claim 18, further comprising at least one additional SIM.

20. A mobile station according to claim 16, wherein the means for authenticating includes an integrated mobile station personal authentication device (MS PAD).

* * * * *